US012559368B2

(12) United States Patent
Carlsson et al.

(10) Patent No.: US 12,559,368 B2
(45) Date of Patent: Feb. 24, 2026

(54) STEAM REFORMING

(71) Applicant: JOHNSON MATTHEY PUBLIC LIMITED COMPANY, London (GB)

(72) Inventors: Mikael Carlsson, Billingham (GB); Andrew Edward Richardson, Billingham (GB)

(73) Assignee: Johnson Matthey Davy Technologies Limited, London (GB)

( * ) Notice: Subject to any disclaimer, the term of this patent is extended or adjusted under 35 U.S.C. 154(b) by 553 days.

(21) Appl. No.: 18/002,921

(22) PCT Filed: Jul. 22, 2021

(86) PCT No.: PCT/GB2021/051892
§ 371 (c)(1),
(2) Date: Dec. 22, 2022

(87) PCT Pub. No.: WO2022/034284
PCT Pub. Date: Feb. 17, 2022

(65) Prior Publication Data
US 2023/0242397 A1 Aug. 3, 2023

(30) Foreign Application Priority Data
Aug. 13, 2020 (GB) ..................................... 2012614

(51) Int. Cl.
*C01B 3/40* (2006.01)
*B01J 23/86* (2006.01)
(Continued)

(52) U.S. Cl.
CPC .............. *C01B 3/40* (2013.01); *B01J 23/862* (2013.01); *B01J 23/892* (2013.01); *B01J 35/40* (2024.01);
(Continued)

(58) Field of Classification Search
CPC .............. C01B 3/40; C01B 2203/1241; C01B 2203/1235; B01J 23/892
See application file for complete search history.

(56) References Cited

U.S. PATENT DOCUMENTS 5,004,592 A * 4/1991 Pinto ........................ B01J 8/062
423/652
5,498,404 A * 3/1996 Hansen .................. B01J 23/755
423/652

(Continued)

FOREIGN PATENT DOCUMENTS

JP 2011103243 A 5/2011
JP 2011-207697 A 10/2011
(Continued)

OTHER PUBLICATIONS

Faramawy, et al. "Natural gas origin, composition, and processing: A review." Journal of Natural Gas Science and Engineering 34 (2016): 34-54 (Year: 2016).*
(Continued)

*Primary Examiner* — Anthony J Zimmer
*Assistant Examiner* — Eric Scott Sherman
(74) *Attorney, Agent, or Firm* — BakerHostetler

(57) ABSTRACT

A process for steam reforming a hydrocarbon feedstock containing one or more nitrogen compounds, including passing a mixture of the hydrocarbon feedstock and steam through a catalyst bed of one or more nickel steam reforming catalysts disposed within a plurality of externally heated tubes in a tubular steam reformer, each tube having an inlet to which the mixture of hydrocarbon and steam is fed, an outlet from which a reformed gas containing hydrogen, carbon monoxide, carbon dioxide, steam, ammonia and methane is recovered. The steam reforming catalyst at least at the outlet of the tubes comprises nickel dispersed over a porous metal oxide surface present as a coating on a non-
(Continued)

NH3 Formation vs. activity at 2% N2 in feed porous metal or ceramic structure The nickel content of the metal oxide coating is in the range of 5 to 50% by weight and the thickness of the coating is in the range of 5 to 150 micrometres.

36 Claims, 3 Drawing Sheets

(51) Int. Cl.

| | | |
|---|---|---|
| *B01J 23/89* | (2006.01) | |
| *B01J 35/40* | (2024.01) | |
| *B01J 35/55* | (2024.01) | |
| *C01B 3/50* | (2006.01) | |
| *C01B 3/506* | (2026.01) | |

(52) U.S. Cl.

CPC .............. *B01J 35/55* (2024.01); *C01B 3/506* (2013.01); *C01B 2203/0233* (2013.01); *C01B 2203/046* (2013.01); *C01B 2203/0495* (2013.01); *C01B 2203/0811* (2013.01); *C01B 2203/0833* (2013.01); *C01B 2203/1017* (2013.01); *C01B 2203/1064* (2013.01); *C01B 2203/1082* (2013.01); *C01B 2203/1241* (2013.01)

(56) References Cited

U.S. PATENT DOCUMENTS

| | | | |
|---|---|---|---|
| 7,566,487 | B2 | 7/2009 | Feinstein |
| 7,761,994 | B2 | 7/2010 | Repasky et al. |
| 7,871,579 | B2 | 1/2011 | Tentarelli |
| 7,976,783 | B2 | 7/2011 | Feinstein |
| 8,178,075 | B2 | 5/2012 | He et al. |
| 8,235,361 | B2 | 8/2012 | Feinstein |
| 8,257,658 | B2 | 9/2012 | Feinstein |
| 2010/0068130 | A1 | 3/2010 | Wilhelm et al. |
| 2012/0195801 | A1 | 8/2012 | Whittenberger et al. |
| 2012/0288420 | A1 | 11/2012 | Feinstein |
| 2012/0294779 | A1 | 11/2012 | Feinstein |
| 2016/0347613 | A1* | 12/2016 | Chlapik .................. B01J 8/062 |
| 2017/0173564 | A1 | 6/2017 | Ovesen et al. |
| 2017/0183228 | A1 | 6/2017 | Lin et al. |

FOREIGN PATENT DOCUMENTS

| | | | |
|---|---|---|---|
| JP | 2013-103149 | A | 5/2013 |
| WO | 2009/054830 | A1 | 4/2009 |
| WO | 2015/132555 | A1 | 9/2015 |
| WO | 2015/155175 | A1 | 10/2015 |

OTHER PUBLICATIONS

Koo, et al., "Ni nanosheet-coated monolith catalyst with high performance for hydrogen production via natural gas steam reforming", Applied Catalysis A: General, vol. 525, pp. 103-109, 2016.
Italiano, et al., "Preparation of structured catalysts with Ni and Ni—Rh/CeO2 catalytic layers for syngas production by biogas reforming processes", Catalysis Today, vol. 273, pp. 3-11, Sep. 15, 2016.

* cited by examiner

STEAM REFORMING

This invention relates to a process of steam reforming hydrocarbons to produce a synthesis gas and to apparatus for carrying out the process.

Synthesis gas comprises hydrogen and carbon oxides (carbon monoxide and carbon dioxide) and may contain nitrogen and other gases such as argon and low levels of methane. The synthesis gas may contain greater or lesser amounts of hydrogen and carbon oxides suited to the particular end use, such as hydrogen manufacture for refineries or fuel cells, ammonia synthesis, methanol synthesis, dimethylether synthesis or the Fischer-Tropsch process for the synthesis of liquid hydrocarbons. Synthesis gas is often produced by a steam reforming process.

In a conventional steam reforming process, a mixture of a hydrocarbon feedstock and steam, and in some cases also carbon dioxide, is passed at an elevated pressure through tubes containing a particulate catalyst, which are externally heated by means of a suitable heating medium, generally a hot gas mixture. The particulate catalyst is normally in the form of shaped units, e.g. cylinders having a plurality of through holes, and is typically formed from a refractory support material, such as alpha-alumina, calcium aluminate or magnesium aluminate, impregnated with a suitable catalytically active metal such as nickel.

Hydrocarbon feedstocks often contain small amounts of nitrogen and this is converted into ammonia over the steam reforming catalyst. Ammonia is undesirable in the synthesis gas and is soluble in the process condensate, which is desirably returned to the process, and processes that seek to minimise its formation have been proposed.

U.S. Pat. No. 5,498,404 discloses a process for catalytical steam reforming of a nitrogen containing carbonaceous feedstock with reduced formation of ammonia, wherein the feedstock is contacted with a supported nickel catalyst further including copper in an amount of 0.01-10% by weight calculated on the amount of nickel in the catalyst. The copper containing catalyst was preferably used as a sub-layer in a fixed bed of a conventional nickel steam reforming catalyst and Example 1 indicates that the catalysts had a lower steam reforming activity as the copper content increased.

WO2009/054830 discloses reforming natural gas without excessive production of ammonia, by using a first stage of catalyst having between about 10% and about 25% nickel, a second stage of catalyst having less than 10% nickel, and a final stage having 2% or less rhodium catalyst of a low concentration. The formation of ammonia is inhibited by reducing the nickel content and surface area in the catalyst at the hottest parts of the tubes, which is towards the outlets.

However, because of the reduced nickel content in the second stage, the conversion is undesirably low, which requires the rhodium catalyst to provide an adequate synthesis gas product. Precious metal catalysts are prohibitively expensive for large-scale generation of synthesis gases in steam reformers and using mixed catalysts adds cost and complexity to the catalyst loading, operation and discharge. Moreover, the mixed catalysts are more challenging to re-process for their metal recovery.

We have found that the ammonia formation may be reduced without resorting to the use of rhodium catalysts by using nickel steam reforming catalyst in which the nickel is present in a thin layer at the surface of the catalyst.

Accordingly the invention provides a process for steam reforming a hydrocarbon feedstock containing one or more nitrogen compounds, comprising passing a mixture of the hydrocarbon feedstock and steam through a catalyst bed consisting of one more nickel steam reforming catalysts disposed within a plurality of externally heated tubes in a tubular steam reformer, wherein each tube has an inlet to which the mixture of hydrocarbon and steam is fed, an outlet from which a reformed gas containing hydrogen, carbon monoxide, carbon dioxide, steam, ammonia and methane is recovered, and the steam reforming catalyst at least at the outlet of the tubes is a structured steam reforming catalyst comprising nickel dispersed over the surface of a porous metal oxide present as a coating on a non-porous metal or ceramic structure, wherein the nickel content of the metal oxide coating is in the range of 5 to 50% by weight and the thickness of the coating is in the range of 5 to 150 micrometres.

The hydrocarbon-containing feedstock fed to the process may comprise any gaseous or low boiling hydrocarbon feedstock, such as natural gas, associated gas, LPG, petroleum distillate, diesel, naphtha or mixtures thereof, or off-gases from chemical processes, such as a refinery off-gas or a pre-reformed gas. The hydrocarbon feedstock preferably comprises methane and may be a pre-reformed gas, an associated gas or natural gas. Natural gas is an especially preferred feedstock. The feedstock may be compressed to a pressure in the range 10-100 bar abs. The pressure of the hydrocarbon feedstock may usefully govern the pressure throughout the process. Operating pressure is preferably in the range 15-80 bar abs, more preferably 20-50 bar abs as this provides an enhanced performance from the process.

If the hydrocarbon feedstock contains sulphur compounds before or, preferably, after compression, the feedstock may be subjected to desulphurisation. Desulphurisation may comprise hydrodesulphurisation using CoMo or NiMo catalysts, and absorption of hydrogen sulphide using a suitable hydrogen sulphide absorbent, e.g. a zinc oxide adsorbent. An ultra-purification adsorbent may usefully be used downstream of the hydrogen sulphide adsorbent to further protect the steam reforming catalyst. Suitable, ultra-purification adsorbents may comprise copper-zinc oxide/alumina materials and copper-nickel-zinc oxide/alumina materials. To facilitate hydrodesulphurisation and/or reduce the risk of carbon laydown in the reforming process, hydrogen may be added to the compressed hydrocarbon feedstock. The amount of hydrogen in the resulting mixed gas stream may be in the range 1-20% vol, but is preferably in the range 1-10% vol, more preferably in the range 1-5% vol.

If the hydrocarbon feedstock contains other contaminants, such as chloride or heavy metal contaminants, these may be removed, prior to reforming, upstream or downstream of any desulphurisation, using conventional adsorbents. Adsorbents suitable for chloride removal are known and include alkalised alumina materials. Similarly, adsorbents for heavy metals such as mercury or arsenic are known and include copper sulphide materials.

Where the hydrocarbon-containing feedstock is a pre-reformed gas containing methane, this may be formed by subjecting a hydrocarbon/steam mixture to a step of adiabatic low temperature steam reforming. The hydrocarbon may be a rich natural gas, naphtha or other hydrocarbon-containing feedstock containing hydrocarbons heavier than methane. Pre-reforming processes are known. In such processes, the hydrocarbon/steam mixture is heated, typically to a temperature in the range 400-650° C., and then passed adiabatically through a fixed bed of a suitable particulate steam reforming catalyst, usually a precipitated catalyst having a high nickel content, for example above 40% by weight, expressed as NiO. During such an adiabatic low temperature reforming step, any hydrocarbons higher than methane react with steam to give a pre-reformed gas comprising a mixture of methane, carbon oxides and hydrogen. The use of an adiabatic reforming step, commonly termed pre-reforming, is desirable to ensure that the feed to the tubular steam reformer contains no hydrocarbons higher than methane and also contains a significant amount of hydrogen. This is desirable in order to minimise the risk of carbon formation on the catalyst in the downstream tubular steam reformer.

In the process, the hydrocarbon feedstock may contain 0.1-25% by volume of one or more nitrogen compounds. The content of the one or more nitrogen compounds in the hydrocarbon feedstock may be 0.5-25% by volume, 1-10% by volume, or 1-5% by volume. The one or more nitrogen compounds may include one or more amines but is typically comprises or consists of nitrogen gas ($N_2$). The nitrogen gas content of the hydrocarbon feedstock may therefore be in the range of 0.1-25% by volume or 0.5-25% by volume, preferably 1-10% by volume, more preferably 1-5% by volume.

The feedstock may be pre-heated. It may conveniently be pre-heated after compression and before desulphurisation with a suitable heat source, such as a fired heater.

The hydrocarbon feedstock is mixed with steam to form a reforming feed gas. The steam introduction may be performed by direct injection of steam and/or by saturation of the feedstock by contact of the latter with a stream of heated water. In some embodiments, the hydrocarbon feedstock is saturated in a saturator fed with hot water to form a saturated gas mixture. The steam content of the saturated gas mixture may, if desired, be increased by the direct addition of steam. The water preferably comprises one or more of condensate streams recovered from the reformed gas, water recovered from the bottom of the saturator, and other condensate produced in the process. The amount of steam introduced is desirably sufficient to give a steam to carbon ratio of at least 1.8:1, i.e. at least 1.8 moles of steam per gram-atom of hydrocarbon carbon in the feedstock. It is preferred that the steam to carbon ratio is in the range 1.8:1 to 5:1, more preferably 2.5:1 to 3.5:1, especially 2.8:1 to 3.2:1 as this provides an optimal balance of hydrogen production and efficiency.

The reforming feed gas comprising the hydrocarbon feedstock and steam may, depending on the steam and nitrogen compound contents, contain 0.02 to 14.0% by volume, optionally 0.1 to 10.0% by volume or optionally 0.2 to 6.0% by volume of the one or more nitrogen compounds.

The reforming feed gas mixture is then desirably pre-heated prior to reforming. In a preferred embodiment, the hydrocarbon/steam mixture is heated by passing it through a fired heater.

Desirably, the mixed stream is heated to an inlet temperature in the range 300-650° C. or 450-650° C., preferably 450-600° C., more preferably 450-550° C. Inlet temperatures in the range of 300-550° C. are particularly suitable when there is no pre-reformer and higher inlet temperatures in the range of 550-650° C. are particularly suitable when there is a pre-reformer.

During the reforming process, methane reacts with steam to produce hydrogen, carbon monoxide and carbon dioxide. Any hydrocarbons containing two or more carbon atoms that are present are converted to methane, which is steam reformed. In addition, the reversible water-gas shift reactions occur. Overall, the process is endothermic, requiring heating of the tubes and catalyst to maintain the reaction and achieve the desired conversion. The heat input to the steam reformer is typically such that the temperature of product gas stream at the outlet of the tubes is higher than the inlet temperature, often in the range of 100 to 350 or 400 degrees Celsius higher than the inlet temperature.

The tubular steam reformer contains a plurality of tubes, usually arranged vertically, through which the gas mixture may be passed, and to which heat is transferred by means of a hot gas flowing around the exterior surfaces of the tubes. The hot gas may comprise a combustion gas or a synthesis gas. The tube inlets are typically at the top end such that the feed gas mixture is typically fed to the top of the steam reformer and flows downward through the tubes.

Thus the tubular steam reformer may have an inlet for the reforming feed gas, an outlet for a reformed gas mixture, and a plurality of vertical tubes in communication with the inlet through which the gas mixture may be passed, and to which heat is transferred by means of a hot gas flowing around the tubes in a heat exchange zone, wherein the tubes each contain one or more steam reforming catalysts provided as layers within the tubes wherein at least the layer of steam reforming catalyst adjacent the outlet is the structured nickel steam reforming catalyst.

The catalyst adjacent the outlets of the tubes in the process is a structured steam reforming catalyst. By "structured steam reforming catalyst" we mean a steam reforming catalyst coating on a non-porous structure, typically a metal or ceramic structure. The nickel in the structured catalyst is dispersed over the surface of a porous metal oxide, which is supported as a surface coating on the non-porous structure.

The metal or ceramic structures are essentially non-porous and so have low surface areas essentially defined by their shape. To provide sufficient activity, the nickel in the structured catalyst is dispersed over a porous metal oxide coated the non-porous metal or ceramic support. The thickness of the porous metal oxide coating containing the nickel on the non-porous structure is in the range of 5 to 150 micrometres, preferably 10 to 100 micrometres, more preferably in the range 10 to 80 micrometres, most preferably in the range 10 to 50 micrometres. The preferred ranges provide an optimum of activity and adhesion and cohesion of the catalyst.

The nickel may be applied to the structure by known wash-coating methods, whereby a slurry of metal oxide, which may include nickel oxide as a component, is applied to the metal or ceramic structure, by dipping or spraying, and then dried and heat treated to bind the metal oxide to the support. Nickel may also be applied to a metal-oxide-coated support by impregnation techniques using a soluble nickel compound, then dried and calcined to convert the nickel compound to nickel oxide. Combinations of these techniques may be used, including applying nickel in solution in combination with a slurry of a metal oxide support.

The steam reforming catalyst on the structure comprises nickel. The nickel content of the metal oxide coating is in the range of 5 to 50% by weight, preferably 10 to 30% by weight, more preferably 10 to 20% by weight. Optionally, a platinum group metal selected from platinum, rhodium, ruthenium or palladium, or a mixture thereof, may be included in the coating. If included, platinum group metal promoters may be present in the coating in amounts in the range of 0.05 to 1% by weight. The coating may be applied to the non-porous support structure in an amount in the range of 10 to 150 $g/m^2$, preferably 10 to 80 $g/m^2$, more preferably 30 to 60 $g/m^2$.

Alkali metal oxides, such as potassium oxide, may also be present in the porous metal oxide coating on the structure, but are usually not necessary. The amount of alkali metal oxide, if present, may be in the range 0.5 to 7.0% by weight.

The porous metal oxide over which the nickel is dispersed may be any suitable refractory oxide, comprising alumina, titania, zirconia, zinc oxide, magnesia, ceria, praseodymium oxide, yttria, and lanthana. Preferred porous metal oxides comprise alumina, zirconia, ceria, lanthana and mixtures of two or more thereof.

In some embodiments, the metal or ceramic structures may be solid bodies such as spheres or cylinders, which may have one or more through-holes. Such structured catalyst may be used in a manner comparable to conventional pelleted steam reforming catalysts.

In some embodiments, the structured catalyst may comprise metal or ceramic structures having a plurality of passages through which a process fluid may pass in ordered, non-random directions. Such structured catalysts are preferred where reduced pressure drop and improved heat transfer are required. The structured catalysts may therefore comprise cylindrical units with a diameter complimentary to the tubes in which they are placed, comprising a plurality of passages through which a process fluid may pass in ordered, non-random directions. By the term "complimentary", the diameter of the cylindrical units may be 1-20 mm less than the internal diameter of the tube in which they are placed so that they fit neatly within the tube. The cylindrical units may comprise perforations and/or internal structures that cause process fluid to flow both axially and radially as it passes through the units. The cylindrical units are preferably stack-able such that they may be readily loaded upon each other and are self-supporting within the tubes. An advantage of using the cylindrical units having a plurality of passages through which a process fluid may pass in ordered, non-random directions rather than coated pellets is that the amount of catalyst coating may be reduced. For example, for coated metal or ceramic pellets the coating may be applied at about 100-150 kg Ni as NiO per meter cubed of tube. For coated cylindrical structures having a plurality of passages through which a process fluid may pass in ordered, non-random directions the amount of coating may be about 4 to 7 kg Ni as NiO per cubic meter of tube.

Structured catalysts prepared using commercially available stainless steel metal foils are preferred.

Preferred structured catalysts are described in US2012/0195801 A1. These structured catalysts comprise a fan in the form of a corrugated metal disk arranged on a central rod. The fan has radial fluid ducts formed from folded metal foils that radially guide the fluid flow to contact the inside wall of the tube; the fan having a top surface, a bottom surface and an outer diameter face such that the radial fluid ducts terminate along the outer diameter face of the fan to form fluid duct openings facing the inside wall of the tube, the fan further having a flat or corrugated metal washer in contact with the top surface or the bottom surface of the fan, where the washer may be in the shape of a ring having an inner diameter and an outer diameter, the washer being in contact with the top surface or the bottom surface of the fan so that the outer diameter of the washer extends radially outward from the outer diameter face of the fan. The washer may further have spacing tabs extending outward from the outer diameter of the washer that separate it from the inside wall of the tube such that the washer creates a gap between the outer diameter face of the fan and the reactor tube. Alternative structured catalyst arrangements on which the steam reforming catalyst may be supported include those described in US2012/0294779, US2012/0288420, U.S. Pat. Nos. 8,257,658, 8,235,361, 7,976,783, 7,566,487, 7,761,994, 8,178,075 and 7,871,579.

There may be a single type of structured catalyst in each tube, in which case the catalyst bed in the tubes consists only of the structured catalyst. Alternatively, there may be two, three or more layers of steam reforming catalysts in the tubes wherein in each case at least the layer adjacent the outlets of the tubes is the structured catalyst.

The tubes may therefore comprise a non-structured steam reforming catalyst upstream of the structured catalyst. The relative amounts of the steam reforming catalysts may vary in thickness to produce the desired conversion. In some embodiments comprising a layer of non-structured catalyst and a layer of structured catalyst adjacent the outlets of the tubes, the structured catalyst layer may comprise 95% to 5% of the volume of the bed or may comprise 80% to 20% of the volume of the bed or may comprise 75% to 25% of the volume of the bed.

The other layers of steam reforming catalyst in the catalyst bed in the remaining part of the tube may be conventional pelleted catalysts in which the nickel is distributed throughout the pellet or eggshell nickel catalysts in which a nickel layer is present only at the surface of a refractory metal oxide pellet. Suitable non-structured catalysts consist of pellets of nickel, and optionally potassium oxide, supported on a refractory oxide support comprising alumina or alkaline earth metal aluminate such as calcium aluminate and/or magnesium aluminate.

Where the catalyst bed consists of two or three layers of nickel steam reforming catalyst, the catalyst layers at the inlets of the tubes preferably are non-structured, pelleted nickel steam reforming catalysts. Where non-structured pelleted catalysts are employed upstream of the structured steam reforming catalyst, the non-structured pelleted catalysts preferably have nickel contents, expressed as NiO, in the range 10% to 30% by weight. Thus, in some embodiments, the catalyst tubes may comprise or consist of two layers of nickel steam reforming catalyst wherein the catalyst layer adjacent the outlets of the tubes is a structured nickel steam reforming catalyst and the catalyst layer adjacent the inlets of the tubes is a non-structured pelleted nickel steam reforming catalyst containing 10% to 30% nickel, expressed as NiO.

The catalyst is typically provided to the tubes of the tubular steam reformer in an oxidic form and activated by reduction of the nickel oxide, to form elemental nickel, in-situ. For example, the catalyst in oxidic form may be placed in the tubes, and the nickel oxide reduced with a reducing agent, such as a hydrogen-containing gas. Known reduction techniques may be used to generate the active catalyst for steam reforming.

Alternatively, nickel oxide in the catalyst may be reduced ex-situ and then the elemental metal coated with a thin passivating layer of oxide using an oxygen containing gas, such as air or nitrogen-diluted air. A mixture of oxygen and carbon dioxide, optionally with nitrogen, may also be used. In this way the reduced catalyst may be transported safely to the user, and the time to generate the active catalyst and quantity of hydrogen used during the subsequent activation, reduced.

Various tubular steam reformer arrangements may be used. The tubular steam reformer may be a conventional top-fired steam reformer or a side-fired steam reformer. In such reformers the hot gas is provided by combusting a fuel gas using a plurality of burners disposed either at the top end or along the length of the tubes. Alternatively, the steam reformer may be a gas-heated reformer (GHR) in which the hot gas may be provided by a flue-gas from a combustion process, or may be a synthesis gas generated by catalytic or non-catalytic partial oxidation of a hydrocarbon, or by autothermal reforming of a hydrocarbon and/or the reformed gas mixture. Furthermore, the hot gas may be mixed with the reformed gas that has passed through the plurality of tubes. The tubes may have a circular cross section and may have a length of 5 to 15 m and preferably an internal diameter in the range 5 to 30 cm or 10 to 15 cm. In use, the tubes operate with a temperature gradient along their length with the inlet end of the tubes cooled by the endothermic steam reforming reactions. The temperature of the tubes and the reacting gas at the inlets may be in the range 300-650° C. or 450-650° C., preferably 450-600° C., more preferably 450-550° C. At the outlet end of the tubes where the conversion to form the synthesis gas is essentially complete, the tubes are hotter. The temperature of the tubes and the reacting gas at the outlets may be in the range 600-950° C. It is possible to express the temperature of the catalyst in the tube as a bed temperature, which is an average temperature of the catalyst between the inlet and the outlet of the catalyst bed within the tube or tubes. The bed temperature may desirably be in a range of from 625-775° C. or from 640-760° C.

The reformed gas, or crude synthesis gas, is recovered from the outlets of the tubes. The reformed gas contains hydrogen, carbon monoxide, carbon dioxide, steam, ammonia and methane. The reformed gas contains some methane due to the equilibrium limitations of the process. The methane content or "methane slip" from a tubular reformer is an indication of the process efficiency. Furthermore, methane can build up in downstream processes using the reformed gas, which is undesirable and accordingly a low methane slip is desired. Using the structured steam reforming catalyst and the reaction conditions, the process is able to provide a low methane slip, e.g. below 15% by volume on a dry gas basis. The methane slip is preferably less than 10% by volume on a dry gas basis and especially less than 5% by volume on a dry gas basis where the crude synthesis gas is not subsequently subjected secondary or autothermal reforming. The term, "on a dry gas basis" discounts the steam content of the reformed gas and is used to allow comparison with other reformed gases having different amounts of steam.

Moreover, the ammonia content of the reformed gas is surprisingly very low. Without wishing to be bound by theory, the Applicants believe that the presence of the nickel only as a thin layer at the surfaces of the structure, means that the side-reaction in which ammonia is formed is inhibited. Thus, in the process the ammonia content of the reformed gas may be below 200 ppmv on a dry gas basis. In some embodiments, the ammonia content of the reformed gas may be below 100 ppmv, preferably below 50 ppmv, more preferably below 10 ppmv on a dry gas basis.

Accordingly, the invention further provides the use, as described herein, of a structured steam reforming catalyst comprising nickel dispersed over the surface of a porous metal oxide, present as a coating on a non-porous metal or ceramic structure, wherein the nickel content of the metal oxide coating is in the range of 5 to 50% by weight and the thickness of the coating is in the range of 5 to 150 micrometres for suppression of ammonia formation during catalytic steam reforming of a nitrogen containing hydrocarbon feedstock.

The process may further comprise cooling the reformed gas to below the dew point to condense steam and then separating the liquid condensate to form a synthesis gas from the reformed gas. The condensate traps most if not all of the ammonia formed in the steam reforming process. The ammonia content of the condensate may be below 400 mg/Litre, preferably below 200 mg/Litre, more preferably below 100 mg/Litre, most preferably below 50 mg/Litre or even 20 mg/Litre. In a preferred embodiment, at least a portion of the condensate is recycled and used to generate steam used in the steam reforming process.

The process of the present invention may be used as part of a process for the manufacture of hydrogen, methanol, dimethyl ether, olefins, ammonia, urea or hydrocarbon liquids, e.g. diesel fuels, obtained by the Fischer-Tropsch synthesis. Thus, the reformed gas may be subjected to further processing including one or more steps of cooling to below the dew point of the steam, separation of condensate, hydrogen separation, carbon dioxide separation, methanol synthesis, dimethyl ether synthesis, olefin synthesis, ammonia synthesis, or hydrocarbon liquid synthesis. Known processes may be used to accomplish these steps.

The invention is further described by reference to the following Examples and FIGS. 1 to 6, in which.

EXAMPLE 1

Figure 1:
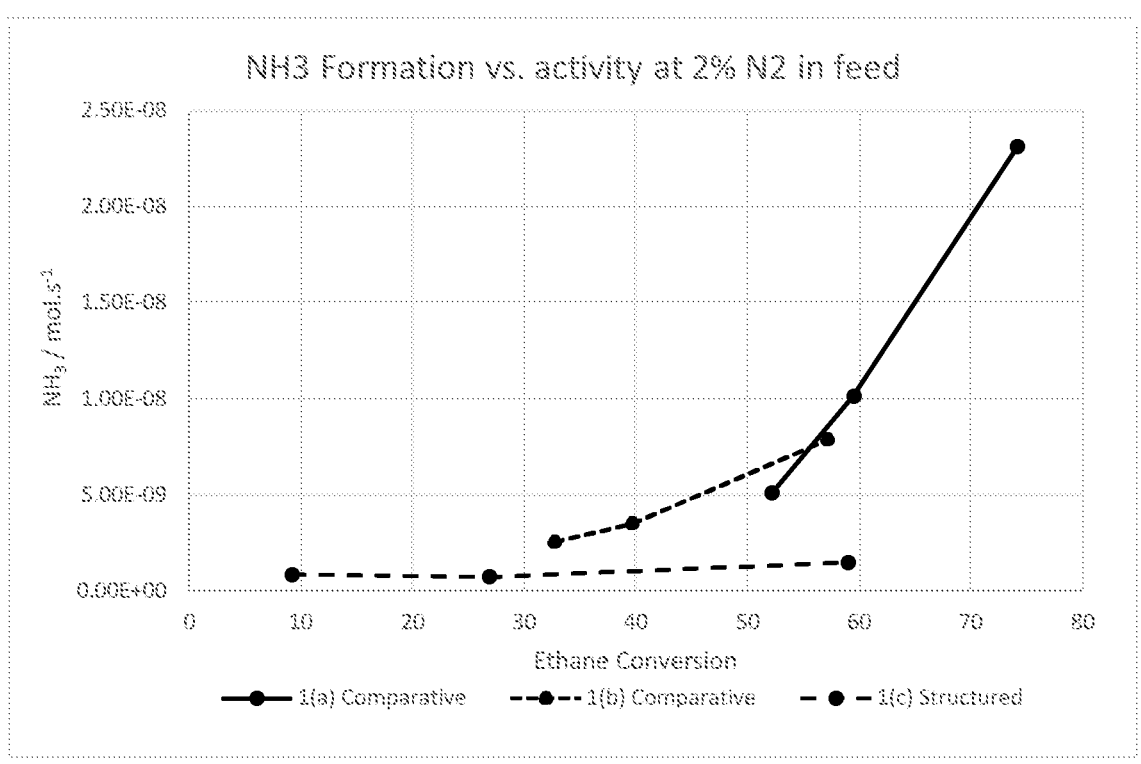
FIG. 1 is a graph depicting the ammonia produced per second versus % mol ethane conversion in tests using a reformer feed containing 2% vol $N_2$.

Testing was carried out on a conventional cylindrical pelleted steam reforming catalysts containing 17.6% wt nickel or 7.2% wt nickel and on a structured catalyst comprising a catalyst coating containing 13% wt nickel and 0.25% wt rhodium on a stabilised aluminium oxide, applied as a wash-coat to stainless steel pellets (3.3×3.3 mm cylinders). The catalyst coating loading was 23 mg/in². The thickness of the catalyst coating was about 30 micrometres.

| Catalyst | Shape | Catalytic metal | Support | NiO content | Amount |
|---|---|---|---|---|---|
| 1(a) Comparative | 3.3 × 3.3 mm cylinder | Ni | Ca-aluminate | 17.6% wt | 24.94 g |
| 1(b) Comparative | 3.3 × 3.3 mm cylinder | Ni | Ca-aluminate | 7.2% wt | 22.85 g |
| 1(c) Structured | 3.3 × 3.3 mm cylinder | Ni/Rh | Stainless steel | 0.07% wt | 86.48 g |

The catalysts were tested in a laboratory scale steam reformer with a single electrically heated reformer tube with an internal diameter of about 25 mm and a length of about 2100 mm. The reactor operated on an up-flow basis. Water for generating steam was supplied to the rig via a variable stroke pump and was fed to the bottom of the reactor where it was vaporised. Natural gas was fed through a separate desulphurisation vessel before being delivered to the reactor via a thermal mass flow controller. Nitrogen and hydrogen were also supplied to the reactor via independent mass flow controllers if required. The water and gases all entered the reactor via the same inlet pipe. The product gas exited the reactor via an outlet from the tube and was cooled to ambient temperature to condense the steam which was then collected in a catch-pot. A small volume of dry exit gas was fed to a Varian CP490 quad-channel micro GC analyser. This gas then returned to the exit gas meter to allow for a full mass balance from the reformer to be calculated.

For each of the catalysts, pellet dimensions were measured to determine how many pellets were required to result in a geometric surface area (GSA) of 21080 $mm^2$. 363 coated pellets were charged for the structured catalyst and 389 pellets were charged for the comparative catalysts. The amounts of nickel charged to the reaction tube were 0.07 g for the structured catalyst and 3.45 g and 1.30 g for the comparative catalysts 1 (a) and 1 (b) respectively. The pellets were diluted to 100 mL with 3.35 to 4.00 mm alumina chips and the mixture charged to the reformer tube near the outlet. The remainder of the reformer tube was charged with 3.35 to 4.75 mm alumina chips.

The catalysts were reduced using 50 vol % $H_2$ in $N_2$ at 600° C. for 2 hours.

Reforming was then carried out at a pressure of 27 barg using bed inlet temperatures in the range of 510 to 800° C. with a steam to carbon ratio of 3:1. Catalyst conditioning of the comparative catalysts was first performed by operating the reformer at inlet temperatures of 610° C., 685° C., 735° C., 800° C., and 735° C., each for at least 8 hours. Catalyst conditioning of the structured catalyst was performed by operating the reformer at inlet temperatures of 510° C., 580° C., 610° C., 685° C., 735° C., 800° C., 735° C., 685° C., 610° C., 580° C. and 510° C. and each for at least 8 hours, followed by treatment with $H_2$ again at 800° C. for 16.5 hours to ensure all of the nickel was in active reduced form. This additional conditioning was to ensure the catalyst was fully reduced and is not believed to effect the ammonia formation in the subsequent testing.

After conditioning, tests were performed on each of the catalysts at inlet temperatures of 685° C., 735° C. and 800° C.

The nitrogen content of the feed was adjusted to provide $N_2$ in the feed gas mixture at the inlet of the catalyst of 2, 5 and 8% by volume on a wet gas basis.

Reformed gases were collected from the reformer and cooled to below the dew point to condense the steam and form condensates containing ammonia. The amount of ammonia in the condensates is proportional to the ammonia formed by the catalysts in the steam reformer.

Condensate samples (250 ml) were collected over a period of 5 minutes at the end of the 8-hour test periods and analysed for their ammonia contents.

The ammonia concentrations in the condensates recovered from the reformed gases were measured using a calibrated Ion Selective Electrode (ISE). Standard solutions of 0.1, 1 and 10 ppm (w/v) ammonia were prepared. A sodium hydroxide buffer solution was added to the sample to liberate the ammonia. When the ISE voltage measurement was stable, the reading was used to generate a linear calibration curve of ISE voltage reading against log 10 ammonia concentration. The ammonia concentrations of the condensates were analysed in the same way, using the ISE measured voltage reading to determine the ammonia concentration by derivation from the calibration curve.

The tests were repeated for each catalyst using feed gases containing different amounts of nitrogen. This was carried out by introducing nitrogen via a nitrogen supply line at various flows to provide the desired level in the feed gas fed to the reformer tube.

Tables showing the results of the ammonia produced in the condensates for the different catalysts for the different nitrogen contents in the feed gas are set out below.

| Comparative Catalyst 1(a) | | |
|---|---|---|
| Bed inlet temperature ° C. | [N2], vol. % | [NH3], mg/L |
| 685 | 2 | 0.102 |
| 685 | 5 | 0.226 |
| 685 | 8 | 0.451 |
| 735 | 2 | 0.209 |
| 735 | 5 | 0.515 |
| 735 | 8 | 0.901 |
| 800 | 2 | 0.501 |
| 800 | 5 | 1.100 |
| 800 | 8 | 1.800 |

| Comparative Catalyst 1(b) | | |
|---|---|---|
| Bed inlet temperature ° C. | [N2], vol. % | [NH3], mg/L |
| 685 | 2 | 0.050 |
| 685 | 5 | 0.081 |
| 685 | 8 | 0.144 |
| 735 | 2 | 0.071 |
| 735 | 5 | 0.210 |
| 735 | 8 | 0.420 |
| 800 | 2 | 0.166 |
| 800 | 5 | 0.435 |
| 800 | 8 | 0.807 |

| Structured catalyst 1(c) | | |
|---|---|---|
| Bed inlet temperature ° C. | [N2], vol. % | [NH3], mg/L |
| 685 | 2 | 0.015 |
| 685 | 5 | 0.018 |
| 685 | 8 | 0.019 |
| 735 | 2 | 0.014 |
| 735 | 5 | 0.020 |
| 735 | 8 | 0.026 |
| 800 | 2 | 0.031 |
| 800 | 5 | 0.060 |
| 800 | 8 | 0.081 |

Over the range of inlet temperatures, the structured catalyst produces lower amounts of ammonia than the comparative examples. However, the catalysts contain differing amounts of nickel, have different nickel surface areas and have different activities. If a catalyst is more active, the amount of steam consumed will be greater than that for a less active catalyst. When this unreacted steam is condensed, it will affect the ammonia concentration. To account for this, a molar flow of water was calculated based on an oxygen balance derived from a knowledge of the feed gas composition and rate and gas-chromatography data on the reformed gas obtained using a GC system coupled to the steam reformer. The difference in the amount of oxygen entering and exiting the system can be used to determine the amount of ammonia produced per second.

Moreover, the structured catalyst was able to produce a reformed gas with a high conversion of the hydrocarbons in the natural gas.

The reformed gas after condensate removal was analysed by gas chromatography to establish the conversion of hydrocarbons to hydrogen and carbon oxides. The conversion of the ethane in the natural gas is a better measurement of overall catalyst activity than methane conversion, which is reversible.

Figure 2:
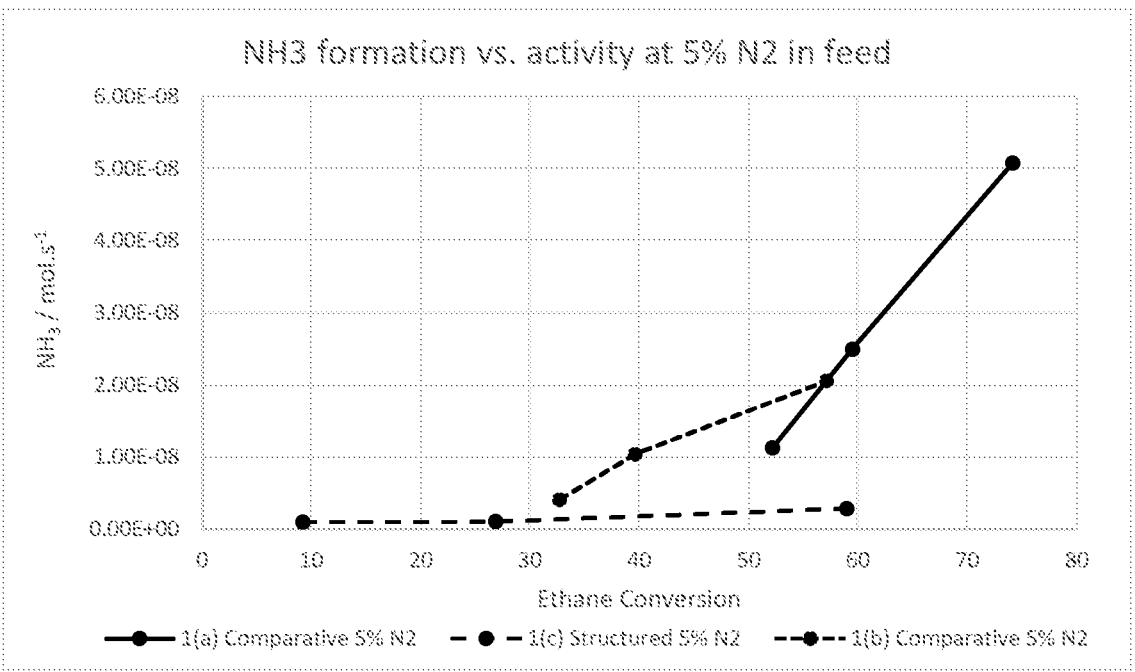
FIG. 2 is a graph depicting the ammonia produced per second versus % mol ethane conversion in tests using a reformer feed containing 5% vol $N_2$.
Figure 3:
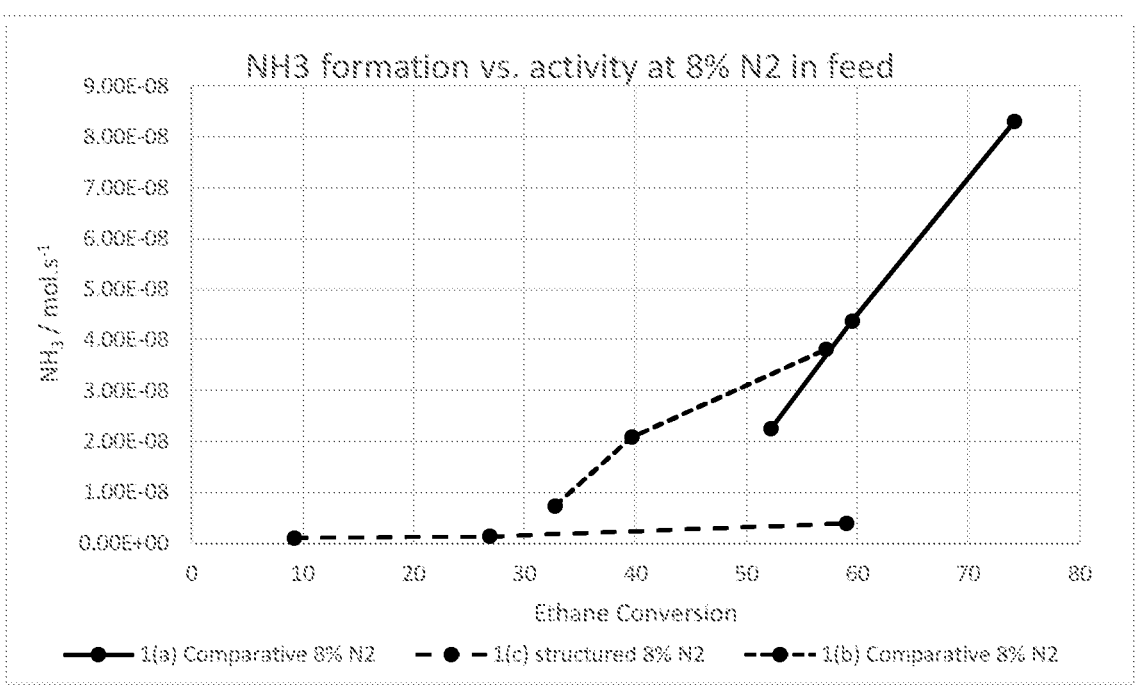
FIG. 3 is a graph depicting the ammonia produced per second versus % mol ethane conversion in tests using a reformer feed containing 8% vol $N_2$.

Plotting the ammonia concentration/second versus the ethane conversion illustrates the effectiveness of the catalyst in terms of activity and ammonia production. FIGS. 1-3 depict the ammonia made/second versus the percentage ethane conversion. The results are set out below:

| | | Catalyst Comparative Catalyst 1(a) | | |
| --- | --- | --- | --- | --- |
| Inlet Temperature | Ethane conversion (%) | 2% $N_2$ $[NH_3]/$ ($\times 10^{-9}$) $mols^{-1}$ | 5% $N_2$ $[NH_3]/$ ($\times 10^{-9}$) $mols^{-1}$ | 8% $N_2$ $[NH_3]/$ ($\times 10^{-9}$) $mols^{-1}$ |
| 685° C. | 52.19 | 5.1 | 11.3 | 22.6 |
| 735° C. | 59.50 | 10.1 | 25.0 | 43.7 |
| 800° C. | 74.12 | 23.1 | 50.8 | 83.1 |

| | | Catalyst Comparative Catalyst 1(b) | | |
| --- | --- | --- | --- | --- |
| Inlet Temperature | Ethane conversion (%) | 2% $N_2$ $[NH_3]/$ ($\times 10^{-9}$) $mols^{-1}$ | 5% $N_2$ $[NH_3]/$ ($\times 10^{-9}$) $mols^{-1}$ | 8% $N_2$ $[NH_3]/$ ($\times 10^{-9}$) $mols^{-1}$ |
| 685° C. | 32.71 | 2.6 | 4.1 | 7.4 |
| 735° C. | 39.64 | 3.5 | 10.4 | 20.8 |
| 800° C. | 57.14 | 7.9 | 20.6 | 38.2 |

| | | Catalyst Structured Catalyst 1(c) | | |
| --- | --- | --- | --- | --- |
| Inlet Temperature | Ethane conversion (%) | 2% $N_2$ $[NH_3]/$ ($\times 10^{-9}$) $mols^{-1}$ | 5% $N_2$ $[NH_3]/$ ($\times 10^{-9}$) $mols^{-1}$ | 8% $N_2$ $[NH_3]/$ ($\times 10^{-9}$) $mols^{-1}$ |
| 685° C. | 9.2 | 0.8 | 1.0 | 1.1 |
| 735° C. | 26.9 | 0.7 | 1.1 | 1.4 |
| 800° C. | 59.0 | 1.5 | 2.9 | 3.9 |

The ethane conversion for the structured catalysts at the temperatures tested start off at a lower level than the comparative catalysts, but it can be seen that at 800° C., the structured catalyst provides a higher ethane conversion than comparative catalyst 1 (b) but with a fraction of the ammonia produced, whether the $N_2$ content of the feed gas was 2, 5 or 8% vol. Comparative catalyst 1 (a) at 735° C. gives an ethane conversion comparable with the structured catalyst at 800° C., but the latter contains a fraction of the nickel content. Testing at higher inlet temperatures for the structured catalyst could improve the ethane conversion further and maintain a low ammonia concentration.

Figure 4:
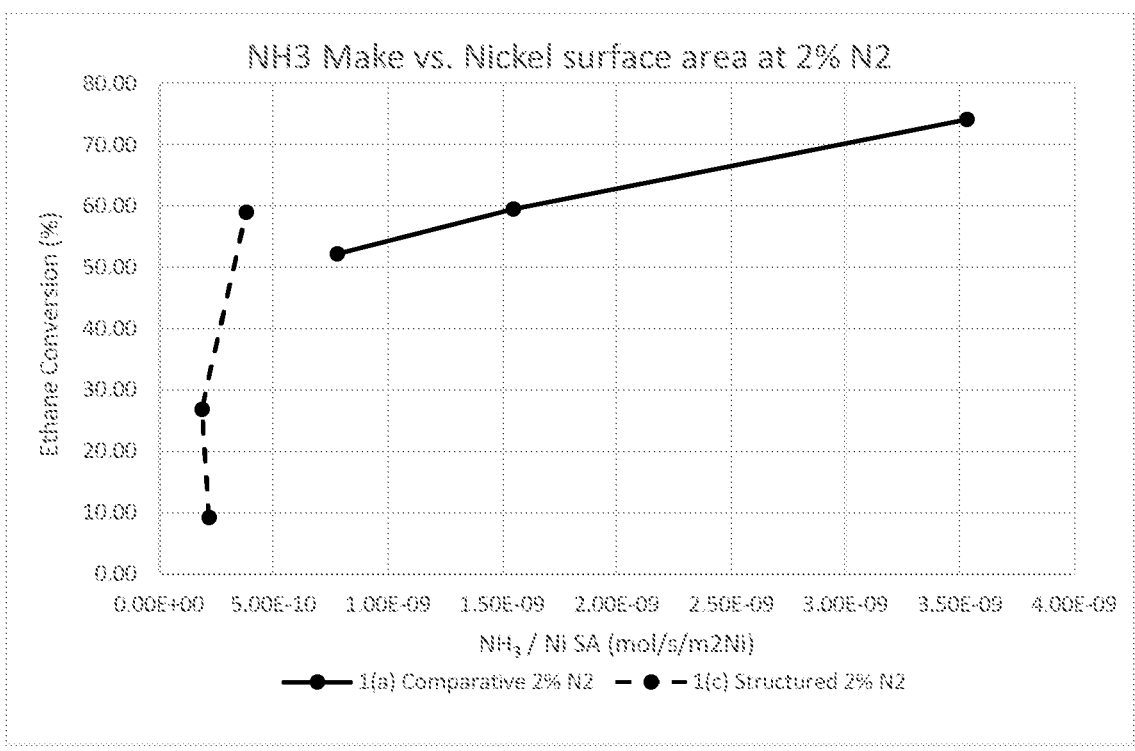
FIG. 4 is a graph depicting % mol ethane conversion for catalysts versus ammonia produced per second per $m^2$ of Ni in the catalysts in tests using a reformer feed containing 2% vol $N_2$.
Figure 5:
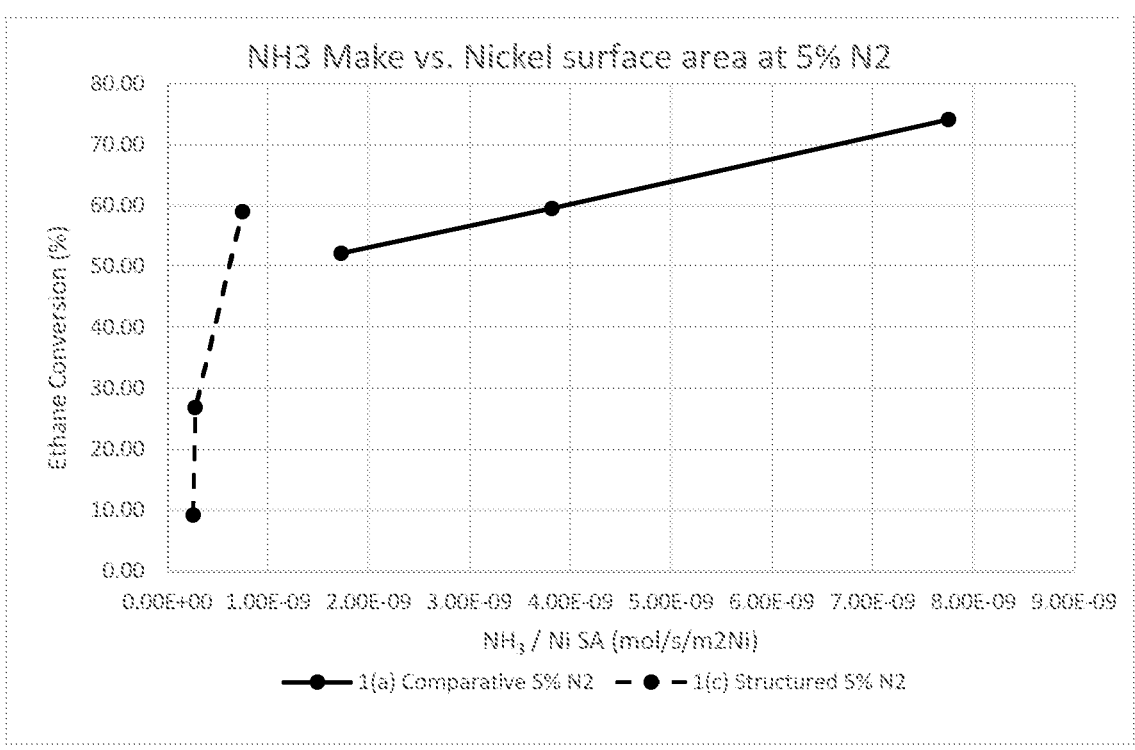
FIG. 5 is a graph depicting % mol ethane conversion for catalysts versus ammonia produced per second per $m^2$ of Ni in the catalysts in tests using a reformer feed containing 5% vol $N_2$.
Figure 6:
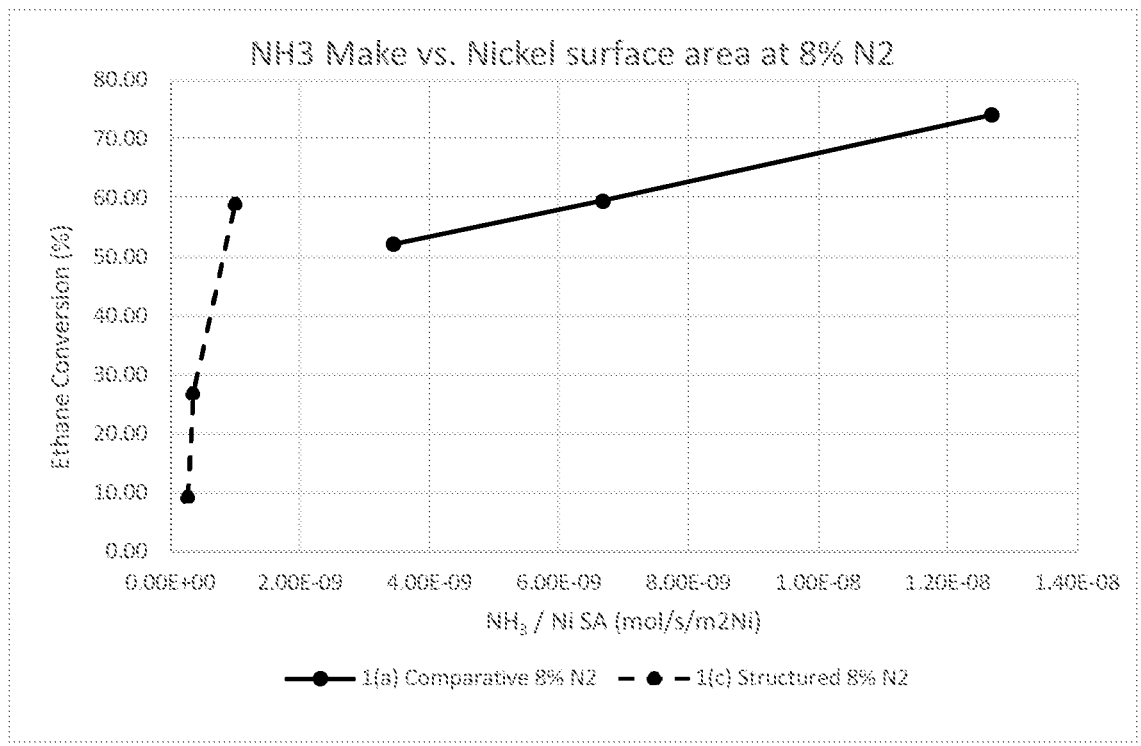
FIG. 6 is a graph depicting % mol ethane conversion for catalysts versus ammonia produced per second per $m^2$ of Ni in the catalysts in tests using a reformer feed containing 8% vol $N_2$.

Whereas the activity of the structured catalyst is below that of standard pelleted catalyst for a given inlet temperature, it is useful to consider the ammonia made when the catalyst is operating at the same hydrocarbon conversion to better reflect the operation that would be expected in service. Furthermore, in the structured catalyst, the nickel crystallites are an order of magnitude smaller than those in the pelleted catalyst giving rise to different nickel surface areas (0.5 $m^2/g$ for Comparative catalyst 1 (a) and 8 $m^2/g$ for the structured catalyst). Taking this into account, the differences between the performance of the structured catalyst and the pelleted catalysts are even more clearly depicted. FIGS. 4, 5 and 6 illustrate the percentage ethane conversion versus the ammonia produced as a function of the nickel surface area. The Figures illustrate that the amount of ammonia produced with the structured catalyst is significantly lower than with conventional pelleted catalysts. Furthermore, it is possible to obtain comparable activity to the pelleted catalyst while using significantly less nickel and producing significantly less ammonia. This has been achieved by dispersing the nickel in a thin coating on the non-porous support. These results illustrate that ammonia formation can be reduced by utilising the structured catalyst near the reformer exit, without impacting overall reforming performance.

The invention claimed is:

1. A process for steam reforming a hydrocarbon feedstock containing one or more nitrogen compounds, comprising passing a mixture of the hydrocarbon feedstock and steam through a catalyst bed consisting of one more nickel steam reforming catalysts disposed within a plurality of externally heated tubes in a tubular steam reformer, wherein each tube has an inlet to which the mixture of hydrocarbon and steam is fed, an outlet from which a reformed gas containing hydrogen, carbon monoxide, carbon dioxide, steam, ammonia and methane is recovered, wherein the ammonia content of the reformed gas is below 200 ppmv on a dry gas basis, and the steam reforming catalyst at least at the outlet of the tubes is a structured steam reforming catalyst comprising nickel dispersed over the surface of a porous metal oxide present as a coating on a non-porous metal or ceramic structure, wherein the nickel content of the metal oxide coating is in the range of 5 to 50% by weight and the thickness of the coating is in the range of 5 to 150 micrometres.

2. The process according to claim 1, wherein the thickness of the porous metal oxide coating containing the nickel on the non-porous structure is in the range of 10 to 100 micrometres.

3. The process according to claim 1, wherein the nickel content of the metal oxide coating is in the range of 10 to 30% by weight.

4. The process according to claim 1, wherein a platinum group metal promoter selected from platinum, palladium, rhodium or ruthenium, or a mixture thereof, is included in the coating.

5. The process according to claim 4, wherein the platinum group metal promoter is present in the coating in amounts in the range of 0.05 to 1% by weight.

6. The process according to claim 1, wherein the porous metal oxide over which the nickel is dispersed is a refractory oxide, comprising alumina, titania, zirconia, zinc oxide, magnesia, ceria, praseodymium oxide, yttria, and lanthana.

7. The process according to claim 1 wherein the amount of coating on the non-porous support structure is in the range of 10 to 150 $g/m^2$.

8. The process according to claim 1 wherein the structured catalyst comprises metal or ceramic structures having a plurality of passages through which a process fluid may pass in ordered, non-random directions.

9. The process according to claim 8, wherein the structured catalyst comprises cylindrical units with a diameter complimentary to the tubes in which they are placed, comprising a plurality of passages through which a process fluid may pass in ordered, non-random directions.

10. The process according to claim 1 wherein the hydrocarbon feedstock comprises methane and a pre-reformed gas, an associated gas or natural gas.

11. The process according to claim 1, wherein the feedstock is compressed to a pressure in the range 10-100 bar abs.

12. The process according to claim 1, wherein the one or more nitrogen compounds comprises nitrogen gas, $N_2$.

13. The process according to claim 12, wherein the nitrogen gas content of the hydrocarbon feedstock is in the range of 0.1 to 25% by volume.

14. The process according to claim 1, wherein the mixture of hydrocarbon feedstock and steam has a steam to carbon ratio in the range 1.8:1 to 5:1.

15. The process according to claim 1 wherein the mixture of hydrocarbon feedstock is fed to the inlets of the tubes at an inlet temperature in the range 300-650° C.

16. The process according to claim 1, wherein the tubular steam reformer contains a plurality of tubes through which the mixture of the hydrocarbon feedstock and steam is passed, and to which heat is transferred by means of a hot gas comprising a combustion gas or a synthesis gas, flowing around the tubes.

17. The process according to claim 1, wherein the catalyst bed consists of one, two, three or more layers of steam reforming catalyst wherein in each case the layer of steam reforming catalyst adjacent the outlets of the tubes is the structured catalyst.

18. The process according to claim 17, wherein there are two or more layers of steam reforming catalyst within the tubes and the structured catalyst layer comprises 95% to 5% of the volume of the bed.

19. The process according to claim 1, wherein the methane content of the reformed gas is less than 15% by volume on a dry gas basis.

20. The process according to claim 1, wherein the process further comprises cooling the reformed gas to below the dew point to condense steam and separating the liquid condensate to form a synthesis gas from the reformed gas.

21. The process according to claim 20, wherein the ammonia content of the liquid condensate is below 400 mg/Litre.

22. The process according to claim 20, wherein at least a portion of the condensate is recycled and used to generate steam used in the steam reforming process.

23. The process according to claim 12, wherein the nitrogen gas content of the hydrocarbon feedstock is in the range of 0.5-25% by volume.

24. The process according to claim 12, wherein the nitrogen gas content of the hydrocarbon feedstock is in the range of 1-10% by volume.

25. The process according to claim 12, wherein the nitrogen gas content of the hydrocarbon feedstock is in the range of 1-5% by volume.

26. The process according to claim 17, wherein there are two or more layers of steam reforming catalyst within the tubes and the structured catalyst layer comprises 80% to 20% of the volume of the bed.

27. The process according to claim 17, wherein there are two or more layers of steam reforming catalyst within the tubes and the structured catalyst layer comprises 75% to 25% of the volume of the bed.

28. The process according to claim 1, wherein the methane content of the reformed gas is less than 10% by volume on a dry gas basis.

29. The process according to claim 1, wherein the methane content of the reformed gas is less than 5% by volume on a dry gas basis.

30. The process according to claim 1, wherein the ammonia content of the reformed gas is below 100 ppmv on a dry gas basis.

31. The process according to claim 1, wherein the ammonia content of the reformed gas is below 50 ppmv on a dry gas basis.

32. The process according to claim 1, wherein the ammonia content of the reformed gas is below 10 ppmv on a dry gas basis.

33. The process according to claim 20, wherein the ammonia content of the liquid condensate is below 200 mg/Litre.

34. The process according to claim 20, wherein the ammonia content of the liquid condensate is below 100 mg/Litre.

35. The process according to claim 20, wherein the ammonia content of the liquid condensate is below 50 mg/Litre.

36. The process according to claim 20, wherein the ammonia content of the liquid condensate is below 20 mg/Litre.

* * * * *